INVENTOR
Richard M. Dilworth
BY S. C. Thorpe
ATTORNEY

Feb. 24, 1959  R. M. DILWORTH  2,874,648
RAILWAY VEHICLE TRUCK
Filed July 26, 1954  2 Sheets-Sheet 2

INVENTOR
Richard M. Dilworth
BY J. C. Thorpe
ATTORNEY

United States Patent Office 2,874,648
Patented Feb. 24, 1959

2,874,648
RAILWAY VEHICLE TRUCK

Richard M. Dilworth, Hinsdale, Ill., assignor to General Motors Corporation, Detroit, Mich., a corporation of Delaware Application July 26, 1954, Serial No. 445,866

5 Claims. (Cl. 105—185)

This invention relates generally to railway vehicle trucks and more particularly to trucks for railway vehicles which are subjected to widely varying loads. It is well known that the vertical deflection of a railway vehicle body, such as that of a freight car, is more or less limited by the couplings which are used to couple these cars together in a train. For example, if a freight car is heavily loaded and a car coupled to it is lightly loaded it is necessary to provide means to limit the deflection of the heavily loaded freight car otherwise difficulties are encountered in coupling and uncoupling these cars. The most common means used tending to restrict the vertical downward deflection of freight cars and the couplers therefor to prevent engagement of vertical limit stops which eliminate cushioning of load are extremely heavy springs between the bolsters and frames of the trucks supporting the ends of these cars. This is not satisfactory, however, because when light or intermediate loads are carried by the cars the stiffness of the springs used gives an extremely poor ride and causes injury to lading because of the resultant insufficient cushioning of shock forces applied to the car.

It is therefore an object of the present invention to provide a novel railway vehicle truck including a bolster assembly subject to variable loads which is resiliently supported so that its rate of downward deflection decreases as the load carried by the bolster increases.

It is a further object of this invention to provide a novel truck having a primary bolster resiliently supported on truck side frames so that the bolster aids in the maintenance of tram between the side frames and its rate of downward deflection decreases with increases in the load carried thereby, the truck also having a secondary bolster which is resiliently supported on the primary bolster for free swinging lateral movement with respect thereto whereby the superior ride obtained with a laterally free swinging bolster is kept intact and the need for an expensive, rigidly formed frame is eliminated.

For a fuller understanding of these and other objects of this invention reference may be had to the accompanying detailed description and drawings, in which.

Figure 1:
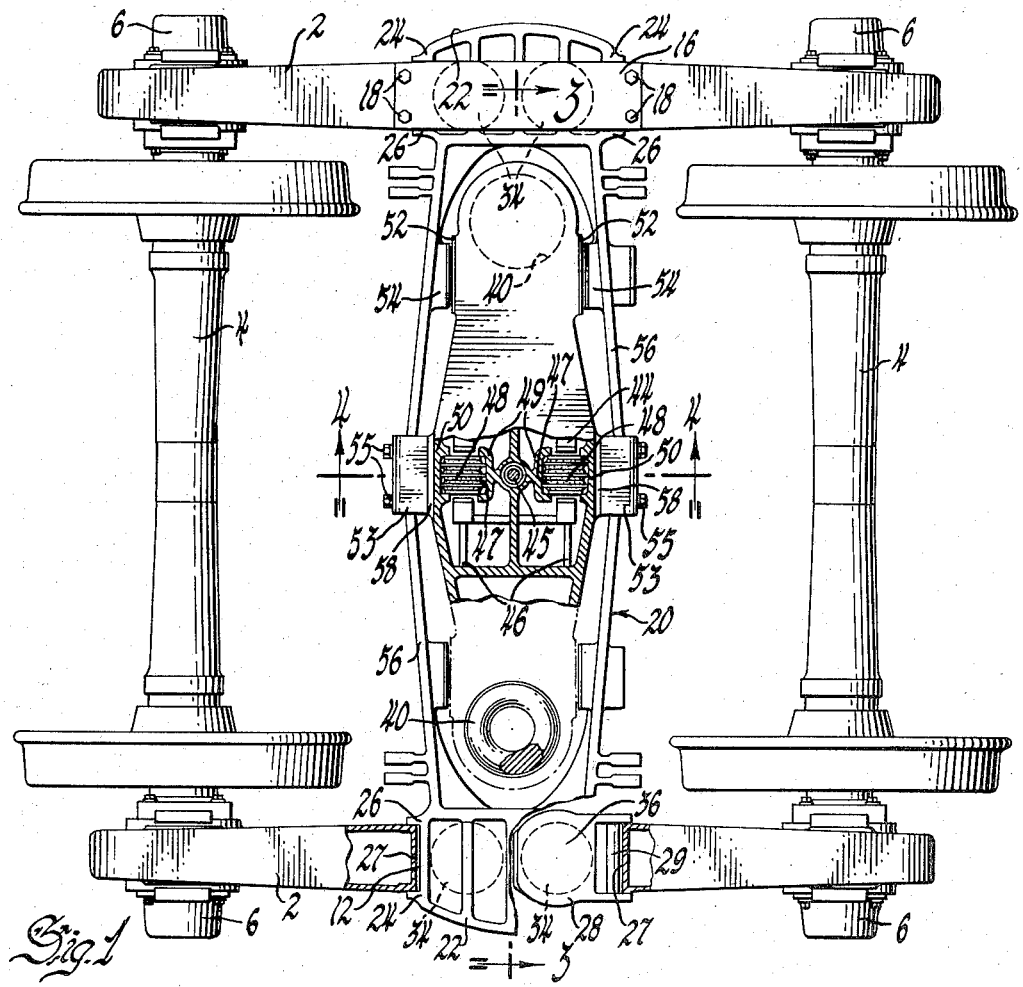
Fig. 1 is a plan view of the truck showing how tram is maintained between the side frame members by a primary bolster and how a free swinging, secondary bolster is resiliently supported on the primary bolster.
Figure 2:
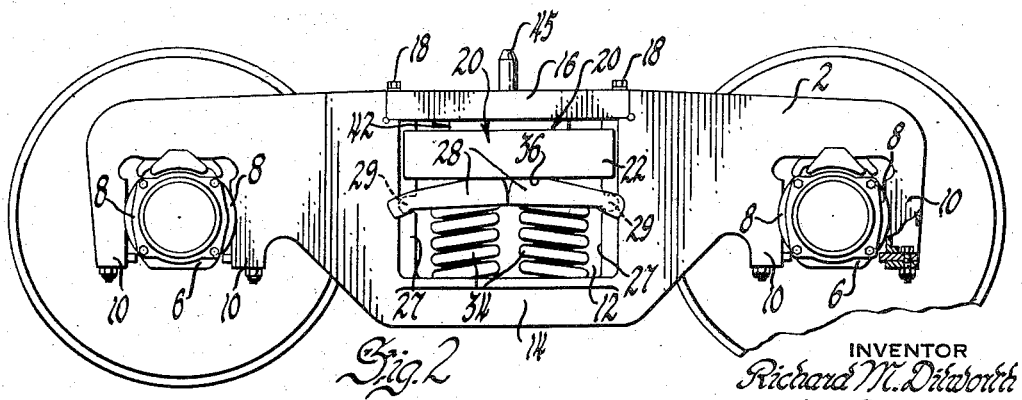
Fig. 2 is a side view in elevation of the truck showing how the primary bolster is supported on pivoted levers in the side frame windows to change the effective length of the levers as the bolster is deflected downwardly under load.

Referring now to the accompanying figures and more particularly to Fig. 1 the truck illustrated therein has a pair of side frame members 2 which are supported at the ends thereof by the usual rotatable wheel and axle sets 4 in which the ends of the axles are journalled in journal box assemblies 6. The wheel and axle sets 4 and the journal boxes 6 partially aid in the maintenance of tram between the side frame members by means of shoulders 8 on journal boxes 6 which slidingly engage inner and outer surfaces on the pedestals 10 of the side frame members 2. Located in each of the side frames 2 is a window 12 defined by a lower tension member 14, an upper compression member 16 and portions 27 of the particular side frame 2. The compression members 16 are removable and, as shown in Figs. 1 and 2, are securely fastened to the side frames 2 by means of studs 18.

Extending between the oppositely disposed side frame members 2 is a primary bolster indicated generally by a numeral 20. The primary bolster 20 has ends 22 which extend through the windows 12. It will be noted that each of the ends 22 is provided with outer and inner shoulders or guide strips 24 and 26, respectively, which engage opposite sides of those portions 27 of the side frame members 2 defining the sides of the window openings 12. By this arrangement the ends 22 of the primary bolster 20 may move up and down in the windows 12 but are prevented by the shoulders 24 and 26 from moving laterally with respect to the side frame members or, to state it another way, it may be said that the primary bolster 20 substantially aids along with wheel and axle sets 4 and journal boxes 6 in the tramming or correct positioning of the side frame members 2 without any need for an expensive, rigid truck frame including transverse transom members rigidly connected between the side frame members.

Figure 5:
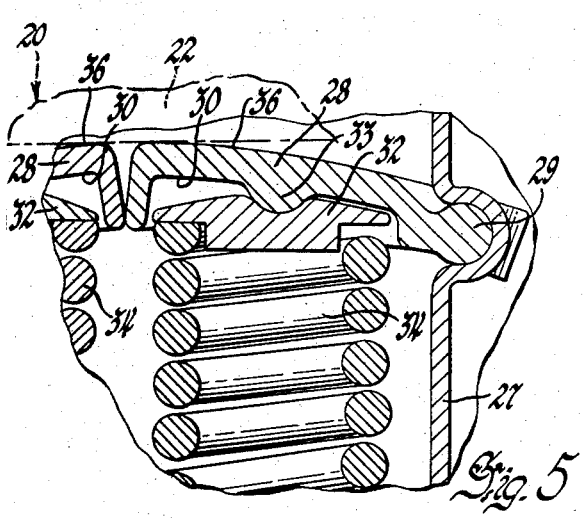
Fig. 5 is an enlarged fragmentary view in section of the means resiliently supporting one end of the primary bolster on a side frame member.

Located in each of the windows 12 below the undersides of the ends 22 of the primary bolster 20 are levers 28 pivotally supported at points 29 by the portions 27 defining the sides of the windows 12. From Fig. 5 it may be seen that each lever 28 is provided with a downwardly facing cupped recess 30 in which is located a downwardly facing spring seat 32 movable relative to the pocket 30 and lever 28 by reason of a ball and socket joint 33. Interposed between each downwardly facing spring seat 32 and the tension members 14 are helical coil springs 34 which partially support the levers 28 and the primary bolster 20 resting thereon. It will be observed particularly in Fig. 5 that the upper surfaces 36 of the levers 28 are convexly curved so that as the primary bolster 20 moves downwardly under load these curved surfaces will engage the undersides of the ends 22 of bolster 20 at points closer to the points of pivotal connection 29 of the levers 28 to the portions 27 of side frames 2.

In other words, the effective length of each lever 28 from its pivotal point of connection 29 to its point of engagement with the underside of primary bolster 20 becomes less and less as the bolster is deflected downwardly by increasing loads applied thereto. By using the levers 28 it will be appreciated that instead of transmitting the load applied to bolster 20 directly to the springs 34 opposing moments having variable lever arms are generated about the points 29. As an example, in Fig. 5 there is a counterclockwise moment acting about point 29 having as a force a portion of the load applied to bolster 20 and as a lever arm the distance from the point of engagement between upper surface 36 and bolster 20 to pivot point 29. Counteracting this moment is a clockwise moment including the force of spring 34 acting through ball and socket joint 33 about point 29. With this arrangement and all the levers 28 acting in the same manner it should be readily appreciated that the rate of deflection of bolster 20 decreases with increases in the load applied thereto, or, in other words, resistance at an increasing rate is offered to downward movement of the bolster 20 when subjected to increases in the load thereon. It should be emphasized here that the above arrangement gives the exact result desired. If light loads are being carried by the railway vehicle the effective lengths of levers 28 are relatively long and the amplitudes of the vertical oscillations of the bolster are large enough to give a soft ride. When heavy loads are being carried by the vehicle the amplitudes of the vertical oscillations of the bolster tend to increase. This tendency, however, is offset by the fact that the effective lengths of the levers 28 become shorter so that a relatively uniform cushioning of shock takes place whether heavy or light loads are being carried. Furthermore, widely varying static loads may be carried and given a "soft" ride with the same vertical deflection.

It should further be emphasized that this unique means for supporting the primary bolster 20 on the side frames 2 also serves as a very effective damping means for damping vertical movement of the bolster 20 relative to the side frames 2. It may be observed from Fig. 5 that as the lever arms 28 move downwardly under the load on bolster 20 the surfaces 36 and the underside of bolster 20 actually slide relative to each other. There is, of course, resistance to this sliding movement which acts to damp the vertical oscillations of bolster 20 relative to side frames 2.

Figure 3:
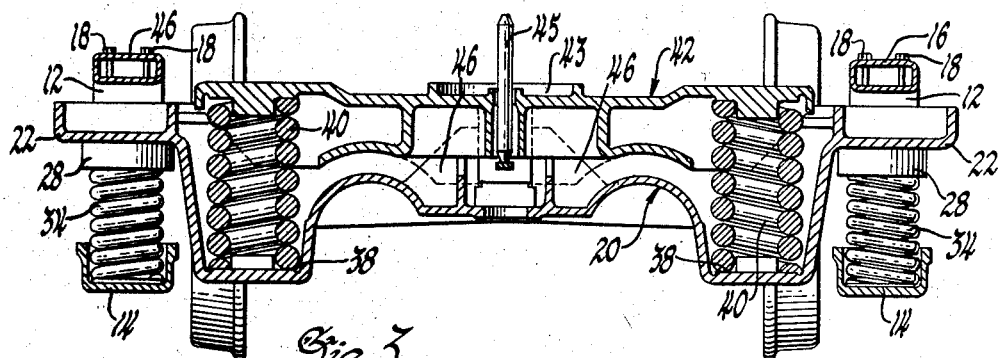
Fig. 3 is an end view in elevation of a section taken on the line 3—3 of Fig. 1 and illustrates how the primary bolster is supported by the longitudinal side frames and in turn resiliently supports a secondary bolster.

In Fig. 3 it will be observed that the primary bolster 20 is provided with a transversely extending elongated cavity open at the top and including oppositely disposed pockets or spring seats 38 in which reside the lower ends of oppositely disposed helical coil springs 40. Supported on the upper ends of helical coil springs 40 is a secondary bolster indicated generally by the numeral 42. The secondary bolster 42 is adapted to swing laterally relative to the primary bolster 20 on the helical coil springs 40, a feature which has been found to give a very superior riding truck. The secondary bolster 42 is provided with a center bearing support 43 for pivotally supporting one end of a railway vehicle truck (not shown). A pin 45 extends upwardly from support 43 and acts to guide the depending bearing on the end of the railway vehicle into place in support 43. In order to transmit longitudinal movement from secondary bolster 42 to primary bolster 20 suitable longitudinally end and center facing chafing plates 52 and 54 have been provided on secondary and primary bolsters respectively.

Figure 4:
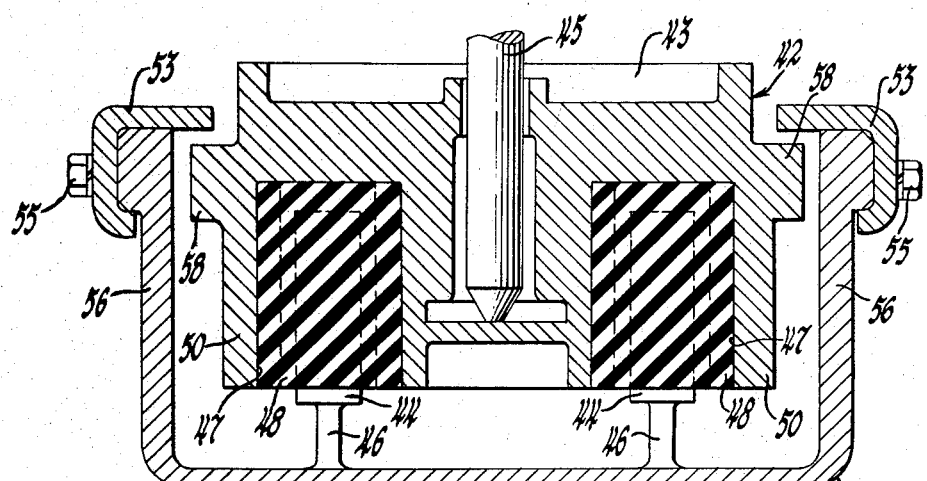
Fig. 4 is an enlarged view in section taken on the line 4—4 of Fig. 1 and shows details of the novel resilient limit stops acting between the secondary and primary bolsters to limit lateral swinging of the secondary bolster relative to the primary bolster.

To limit lateral swinging of bolster 42 relative to bolster 20 and side frames 2 a unique limit stop assembly has been provided which is best shown in Figs. 1, 3 and 4. This unique limit stop assembly comprises laterally inwardly facing oppositely disposed stops 44 which are supported on and rigidly secured to the upwardly facing inner surface of the primary bolster 20 by means of the webs 46. Interposed between longitudinally spaced sets of the oppositely disposed stops 44 are resilient layers 48 which are secured below the underside of the secondary bolster 42 at the center thereof by being preloaded in pockets 47 formed by the webbing 49 and walls 50 of bolster 42. The pockets 47 are formed with oppositely disposed lateral openings for the alternate entry of oppositely disposed stops 44 which upon extended lateral movement of bolster 42 on bolster 20 cushion this movement and limit any further lateral movement.

To limit upward vertical movement of secondary bolster 42 relative to primary bolster 20 suitable stop plates 53 have been secured by studs 55 to the centers of walls 56. The stop plates 53 extend over projections 58 on walls 50 of secondary bolster 42 so that upon extended upward movement of secondary bolster 42 relative to primary bolster 20 the projections 58 engage the undersides of plates 53 and any further upward movement is prevented.

I claim:

1. In a railway vehicle truck having a truck frame and a load-carrying truck bolster, a bolster helical coil spring seated on said frame, an upper spring seat supported on the upper end of said spring and having an upwardly facing spherical recess therein, a lever arm pivotally supported on said frame and having a downwardly facing spherical ball portion on the underside thereof removed from its point of pivotal support on said frame, said spherical ball portion being received in said spherical recess, an upwardly facing curved surface on said arm supporting said load-carrying bolster for slidable movement thereon, said load-carrying bolster being supported on said surface at points progressively approaching the point of pivotal support of said arm as said bolster moves downwardly under increasing loads whereby the rate of downward deflection of said bolster under increasing loads decreases and the vertical movement of said bolster relative to said frame is damped.

2. A railway vehicle truck comprising a pair of oppositely disposed longitudinally extending side frame members supported by longitudinally spaced rotatable wheel and axle sets, a primary truck bolster extending transversely between said frame members and resiliently supported thereon for vertical movement relative thereto, cooperating vertical guide means on said frame members and bolster to maintain said side frame members parallel and substantially immovable in either direction laterally relative to each other so as to maintain tram therebetween, a secondary truck bolster resiliently supported on said primary bolster for lateral swinging movement relative to said side frame members and cooperating stops on said primary and secondary bolsters to limit lateral swinging of said secondary bolster relative to said frame members.

3. In a railway vehicle truck the combination of a pair of transversely spaced longitudinally extending side frame members supported at the ends thereof by rotatable wheel and axle sets, a single dished primary load carrying truck bolster open at the top extending transversely between said members and maintaining tram therebetween, resilient means supporting said primary bolster on said frame members for vertical movement relative thereto, cooperating vertical guide means on said frame members and bolster to maintain said frame members parallel and substantially immovable laterally relative to each other, cantilever means pivoted on said vertical guide means of said side frame members and disposed between the primary bolster and the resilient means and contacting each of them, the primary bolster and resilient means being in opposed relation with respect to each other with the primary bolster acting at a point on the cantilever means further from the pivot of said means than the point on said means on which said resilient means acts, the cantilever means between the said pivot and point of contact of said bolster constituting a lever arm, the surfaces of said cantilever means and primary bolster contacting each other being of such shape that upon increasing load said lever arm of the primary bolster becomes shorter so that substantially the same vertical deflection of the resilient means is obtained under all load conditions, a secondary load carrying truck bolster nested in said primary bolster and resiliently supported on said primary bolster for lateral swinging movement relative to said members, and cooperating stops on said primary and secondary bolsters to limit lateral swinging of said secondary bolster relative to said side frame members.

4. In a railway vehicle truck having a truck frame and a load carrying truck bolster, a spring seated on said frame, a lever arm pivotally supported on said frame and supported on said spring at a point removed from its point of pivotal support, said bolster being supported on said lever arm at a point removed from said point of pivotal support and vertical guiding means for guiding said bolster on said frame, vertical movement of said bolster relative to said frame causing the distance of said support point from said pivot point to change in relation to the movement of said arm about its point of pivotal support.

5. In a railway vehicle truck having a truck frame and a load carrying truck bolster, a spring seated on said frame, a lever arm pivotally supported on said frame and supported on said spring at a point removed from its point of pivotal support, an upwardly facing convex surface on said arm supporting said load carrying bolster for slidable movement thereon at a point removed from said point of pivotal support and vertical guiding means for guiding said bolster on said frame, vertical movement of said bolster relative to said frame causing the said point of contact of said bolster on said arm to change in relation to the movement of said arm about its point of pivotal support.

References Cited in the file of this patent

UNITED STATES PATENTS

| | | |
|---|---|---|
| 2,379,521 | Haseltine | July 3, 1945 |
| 2,395,967 | Haseltine | Mar. 5, 1946 |
| 2,396,796 | Lounsberry | Mar. 19, 1946 |
| 2,405,398 | Buckwalter | Aug. 4, 1946 |
| 2,473,678 | Dath | June 21, 1949 |
| 2,645,188 | Williams | July 14, 1953 |
| 2,652,001 | Travilla et al. | Sept. 15, 1953 |
| 2,723,628 | Rossell | Nov. 15, 1955 |